United States Patent
Svanberg et al.

(10) Patent No.: US 12,117,389 B2
(45) Date of Patent: *Oct. 15, 2024

(54) OPTICAL FLOW CELL FOR AN OPTICAL MEASURING DEVICE

(71) Applicant: Cytiva Sweden AB, Uppsala (SE)

(72) Inventors: Henrik Svanberg, Uppsala (SE); Hanno Ehring, Uppsala (SE); Erik Nils Ostlund, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,722

(22) Filed: Sep. 28, 2021

(65) Prior Publication Data

US 2022/0018757 A1 Jan. 20, 2022

Related U.S. Application Data

(63) Continuation of application No. 15/565,268, filed as application No. PCT/EP2016/057851 on Apr. 8, 2016, now Pat. No. 11,137,342.

(30) Foreign Application Priority Data

Apr. 10, 2015 (GB) .................................. 1506095

(51) Int. Cl.
 *G01N 21/05* (2006.01)
 *G02B 6/36* (2006.01)
 (Continued)

(52) U.S. Cl.
 CPC ........... *G01N 21/05* (2013.01); *G02B 6/3616* (2013.01); *G02B 6/3644* (2013.01);
 (Continued)

(58) Field of Classification Search
 CPC .................... G01N 2021/058; G01N 21/05
 See application file for complete search history.

(56) References Cited

U.S. PATENT DOCUMENTS

| 4,182,017 A | 1/1980 | Ford |
| 5,442,437 A | 8/1995 | Davidson |

(Continued)

FOREIGN PATENT DOCUMENTS

| EP | 1879017 A1 | 1/2008 |
| JP | 2001-132511 A | 5/2001 |

(Continued)

OTHER PUBLICATIONS

Japanese Office Action for JP Application No. 2017-552905 mailed Jan. 20, 2020 (10 pages with English translation).

(Continued)

*Primary Examiner* — Thanh Luu
(74) *Attorney, Agent, or Firm* — Eversheds-Sutherland (US) LLP

(57) ABSTRACT

The present invention relates to an optical flow cell for a measuring device, having an input light guide with a light exit surface, an output light guide with a light entrance surface, said input light guide and output light guide being integrated with a holder to form an optical flow cell, and wherein the holder extends along a first axis and has a through hole for receiving a flow of a sample fluid, said through hole being transversal to said first axis, and the input light guide and output light guide further are arranged in said holder so that the light exit surface and the light entrance surface extend into said through hole and are arranged to be in optical alignment with each other and at a first distance from each other. The invention also relates to a measuring device having at least one optical flow cell.

13 Claims, 7 Drawing Sheets

(51) Int. Cl.
    *G02B 6/38*     (2006.01)
    *G02B 6/42*     (2006.01)

(52) U.S. Cl.
    CPC ......... *G02B 6/3825* (2013.01); *G02B 6/3861* (2013.01); *G02B 6/4219* (2013.01); *G01N 2021/052* (2013.01); *G01N 2201/0664* (2013.01); *G01N 2201/0668* (2013.01); *G01N 2201/0813* (2013.01); *G01N 2201/086* (2013.01); *G02B 6/36* (2013.01)

(56) References Cited

U.S. PATENT DOCUMENTS

| | | | |
|---|---|---|---|
| 5,521,384 | A | 5/1996 | Lynch |
| 8,699,031 | B2 | 4/2014 | Arimoto et al. |
| 11,137,342 | B2 * | 10/2021 | Svanberg ............. G02B 6/3825 |
| 2002/0154309 | A1 * | 10/2002 | Walker ............... G01N 21/0303 356/436 |
| 2002/0154430 | A1 | 10/2002 | Walker et al. |
| 2002/0167663 | A1 | 11/2002 | Martino et al. |
| 2003/0076491 | A1 * | 4/2003 | Mueller ................ G01N 21/05 356/246 |
| 2004/0061854 | A1 | 4/2004 | Walker et al. |
| 2012/0327397 | A1 | 12/2012 | Tormod |
| 2013/0341260 | A1 | 12/2013 | Dehmer |
| 2016/0216213 | A1 * | 7/2016 | O'Brien ............. G01N 15/0227 |

FOREIGN PATENT DOCUMENTS

| | | |
|---|---|---|
| JP | 2002-181694 A | 6/2002 |
| JP | 2008-268107 A | 11/2008 |
| WO | 97/28477 A1 | 8/1997 |
| WO | 2011/093775 A1 | 8/2011 |

OTHER PUBLICATIONS

PCT International Search Report and Written Opinion for PCT Application No. PCT/EP2016/057851 mailed Jul. 12, 2016 (13 pages).

GB Search Report for GB Application No. 1506095.7 mailed Aug. 6, 2015 (4 pages).

Anonymous, "Titanium—Wikipedia, the free encyclopedia, "2012, XP055284285, http://web.archive.org/web/20120301161827/https://en.wikipedia.org/wiki/Titanium.

* cited by examiner

OPTICAL FLOW CELL FOR AN OPTICAL MEASURING DEVICE

CROSS REFERENCE TO RELATED APPLICATIONS

This application is a continuation of U.S. application Ser. No. 15/565,268, filed on Oct. 9, 2017, which claims the priority benefit of PCT/EP2016/057851 filed on Apr. 8, 2016 which claims priority benefit of United Kingdom Application No. 1506095.7 filed Apr. 10, 2015. The entire contents of which are hereby incorporated by reference herein.

TECHNICAL FIELD

The present invention relates to an optical flow cell for a measuring device, and to a measuring device having an optical flow cell.

BACKGROUND

Optical measuring devices are used within a plurality of technical fields where a solution is allowed to flow across an optical flow cell that serves to determine a concentration of a substance within the solution. Examples of such technical fields are fluid chromatography and filtering, among others.

The flow cells used in the measuring devices are generally optical flow cells, having a first light guide with an exit surface where light is emitted and a second light guide with an entrance surface where light is received. The distance between the exit surface and entrance surface can be relatively long for solutions of lower concentration, but in order to achieve reliable detection also for solutions of high concentration the distance should be smaller, typically in the range of 0.1-0.2 mm. To achieve satisfactory quality of measurements, the distance must be kept constant and is not allowed to deviate from a set value more than 5%.

A common problem within this area is that corrections or adjustments to the optical flow cell such as after a cleaning or service operation of the measuring device can create such deviations and render the optical flow cell unreliable or requiring cumbersome calibration operations before normal operation can resume. The calibration is often performed through the use of a reference solution with a known concentration, and a series of measurements in order to allow the distance between the light guides of the optical flow cell to be adjusted. This, however, is a time consuming process and may also require extensive cleaning of the measuring device afterwards to remove all traces of the reference solution. Alternatively, the optical flow cell can be used without calibrations but the resulting data will be unreliable and unusable in many applications.

There is therefore clearly a need for a more reliable optical flow cell for measuring devices to overcome this drawback.

SUMMARY OF THE INVENTION

The object of the present invention is to eliminate or at least to minimize the disadvantages described above. This is achieved through an optical flow cell for a measuring device as defined in the independent claim.

One advantage of the optical flow cell is that the integration of the light guides and the holder into an integrated component will allow for a removal, cleaning and reinsertion of the entire optical flow cell, allowing operation of the measuring device to continue within a short space of time and at the same quality as the optical flow cell previously used. If the flow cell has been damaged, it can alternatively be replaced. Another advantage is that the accuracy of measurement in the measuring device can be maintained at a desired level even after service or maintenance, by allowing for a cleaning or replacing of the optical flow cell without altering the pathway or by allowing for the insertion of a new optical flow cell having a well-defined pathway within the acceptable tolerances.

According to an aspect of the invention, the holder comprises a material with a thermal expansion of less than $20 \times 10{-6}$ m/mK. Thereby, the first distance between the first and second light guides can be kept constant even when subjecting the optical flow cell to considerable variations in temperature. Preferably, the holder comprises titanium, which is a durable material with suitably low thermal expansion and very suited to use in an optical flow cell component.

According to another aspect of the invention, the first distance is 0.2 mm or less, preferably 0.1 mm. Thereby, the optical flow cell according to the invention is arranged to provide detection of substances of high concentration with a high level of accuracy, and thanks to the integration into a single optical flow cell component, the first distance is arranged to be maintained within the tolerances determined during manufacture.

According to yet another aspect of the invention, the input light guide is mounted in a first light guide holder and the output light guide is mounted in a second light guide holder, and the first light guide holder and second light guide holder are mounted in the holder through a first and second hole, respectively. Thereby, the light guides are stably mounted and arranged to be securely held by light guide holders to prevent damage or bending to the light guides and facilitate the integration into an optical flow cell component. Preferably, the first hole and second hole are threaded and the first light guide holder and second light guide holder comprise corresponding threads, giving a reliable mounting and allowing for a secure fixation in relation to the holder, preferably by means of an adhesive such as an epoxy resin or a methacrylate.

According to a further aspect of the invention, the input light guide is arranged to protrude from the first light guide holder into the through hole, and wherein the output light guide is arranged to protrude from the second light guide holder into the through hole. Thereby, the flow between the exit light surface and the entrance light surface is improved.

More advantages and benefits of the present invention will become readily apparent to the person skilled in the art in view of the detailed description below.

BRIEF DESCRIPTION OF THE DRAWINGS

FIG. 3b shows a planar view of the light guide holder of FIG. 3a;

FIG. 4b shows a cross-sectional perspective view of the measuring device of FIG. 4a;

FIG. 6 shows a planar view from above of the measuring device of FIG. 4a.

DETAILED DESCRIPTION

Figure 1:
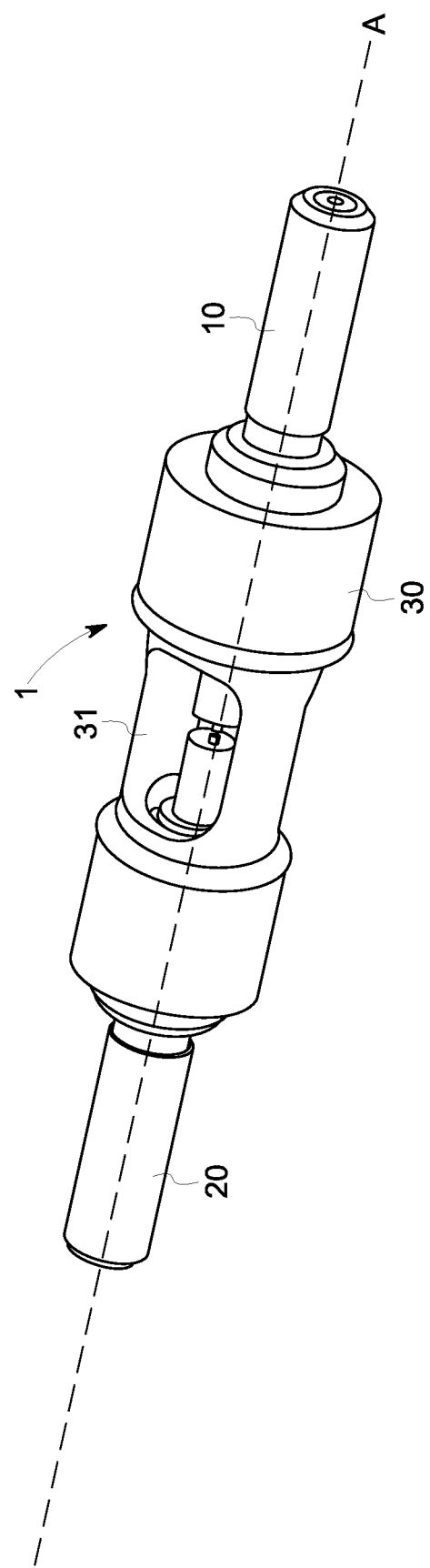
FIG. 1 shows a perspective view of an optical flow cell according to a preferred embodiment of the invention.

FIG. 1 discloses an optical flow cell 1 according to a preferred embodiment of the present invention, with a holder 30 that extends along an axis A and has a substantially transverse through hole 31 arranged to allow a through flow of a sample fluid. The optical flow cell 1 further comprises a first light guide holder 10 and a second light guide holder 20 that are arranged along said axis A. The optical flow cell 30 can be inserted into a measuring device, as will be described in more detail further below, and is able to detect a substance in a flow of a fluid through the through hole 31. Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the exemplary methods, devices, and materials are described herein.

Figure 2:
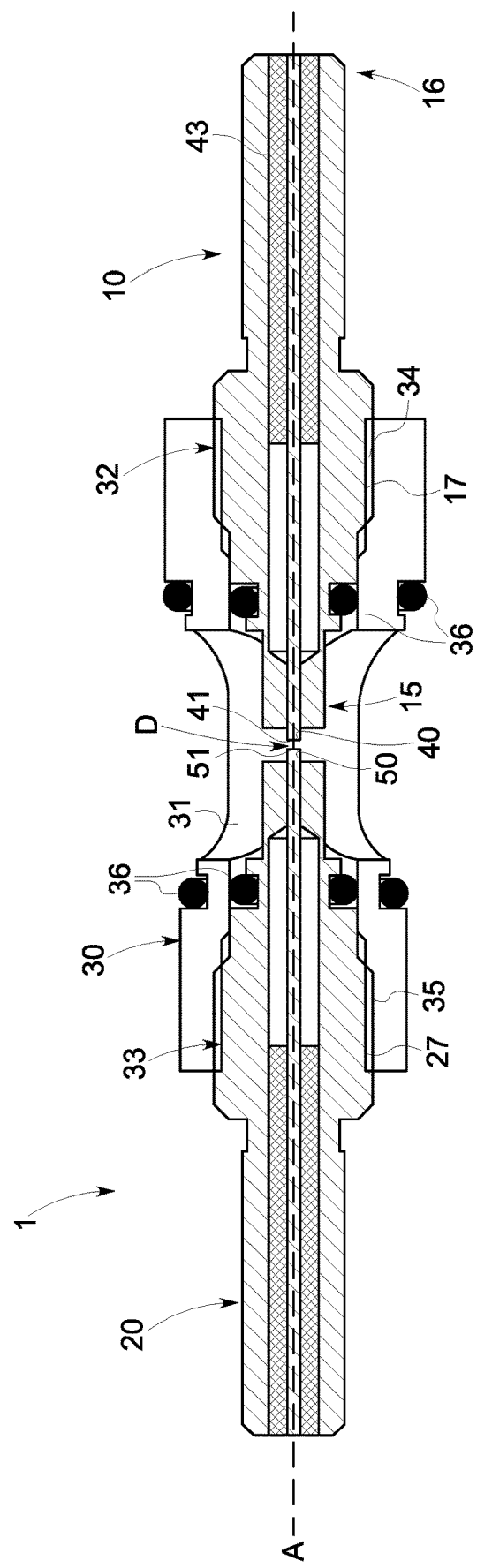
FIG. 2 shows a cross-sectional view of the optical flow cell of FIG. 1.

FIG. 2 shows the optical flow cell 1 of FIG. 1 in a cross-sectional view, showing that the first light guide holder 10 is mounted in a first hole 32 and the second light guide holder 20 is mounted in a second hole 33 along the axis A of the holder 30 and protrude into the through hole 31. Inside the first light guide holder 10 is an input light guide 40, for instance in the form of an optical fiber, with a light exit surface 41 through which light can be emitted. Similarly, the second light guide holder 20 comprises an output light guide 50 with a light entrance surface 51 through which light can be received and transmitted along the output light guide 50. The input light guide 40 and output light guide 50 are arranged in optical alignment, so that light emitted from the light exit surface 41 can be received by the light entrance surface 51. The light exit surface 41 and the light entrance surface 51 are further arranged at a first distance D from each other, and the first distance D is preferably 2 mm or less. It is, however, especially advantageous if the first distance D is very small, namely 0.2 mm or less, preferably 0.1 mm. This is advantageous in that a higher concentration of a substance flowing through the through hole 31 of the holder 30 can be detected with accuracy if the first distance D is kept small. The first distance D of the optical flow cell 1 is also commonly known as a pathway of the optical flow cell, and these terms will be used interchangeably below.

The holder 30 comprises a material with low thermal expansion, i.e. with a thermal expansion of $20 \times 10^{-6}$ m/mK or less. Preferably, the holder 30 comprises titanium, but it can alternatively comprise another material such as a ceramic material, for example glass.

The first light guide holder 10 and second light guide holder 20 are mounted in the first hole 32 and second hole 33, respectively, by screwing so that a holder thread 34, 35 of each hole 32, 33 interact with light guide holder threads 17, 27, respectively, and the light guide holders 10, 20 are fixated in the holder 30 as will be described in more detail further below. Sealing rings 36 are also provided to prevent leakage from the through hole 31.

Figure 3A:
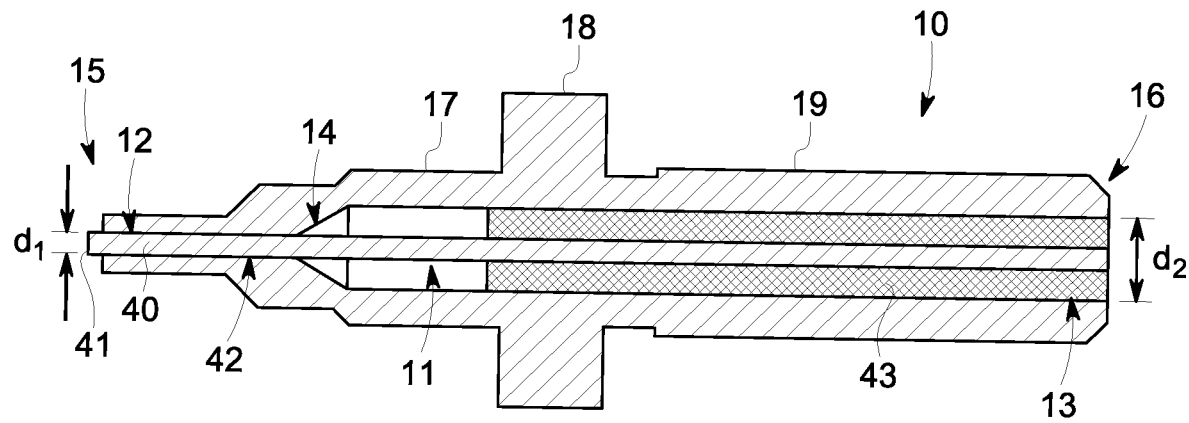
FIG. 3a shows a cross-sectional view of a light guide holder of the optical flow cell of FIG. 1-2.

FIG. 3a shows the first light guide holder 10, but it is to be noted that the second light guide holder 20 is similar to the first light guide holder 10 and that everything said with regard to the one also applies equally to the other. Thus, the first light guide holder 10 is elongated and has a first end 15 and a second end 16, and a longitudinal through hole 11 with a narrow portion 12 at the first end 15 and a wide portion 13 at the second end 16. The wide portion 13 ends in a tapering portion 14 that is connected to the narrow portion 12 so that a diameter of the longitudinal through hole 11 is smoothly decreased from a second diameter $d_2$ at the wide portion 13 to a first diameter $d_1$ at the narrow portion 12. Along an outer surface of the first light guide holder 10 is a threaded section 17 that is adapted to interact with a corresponding thread of the holder 30.

Inside the first light guide holder 10, the input light guide 40 is arranged along the entire length of the longitudinal through hole 11 so that the light exit surface 41 protrudes from the first end 15. This is advantageous since the smaller diameter of the input and output light guides 40, 50 compared to the diameter of the input and output light guides 40, 50 together with the first end of the first and second light guide holders 10, 20, respectively, allows for an improved flow between the light guides 40, 50.

The first diameter d1 is only slightly larger than a diameter of the input light guide 40, preferably less than 10% larger, so that the input light guide is securely held and movements of the input light guide 40 are prevented. The input light guide 40 is held by a tube 43, preferably a tube that surrounds the input light guide 40. The purpose of the tube 43 is to guide the input light guide 40 during mounting in the first light guide holder 10 and it is advantageous if the tube 43 is stiff and resilient so that said mounting is facilitated, as will be described in more detail below.

In order to fixate the input light guide 40 inside the first light guide holder 10, at least a part of the longitudinal through hole 11 is filled with a substance that surrounds the input light guide 40 and prevents movements in relation to the first light guide holder 10. The substance can be an adhesive, for instance an inert adhesive with a low viscosity, preferably a viscosity of 400 cPs or less. One example of a suitable adhesive is an epoxy adhesive, for example Epo-tek® adhesive sold by Epoxy Technology, Inc.

Figure 3B:
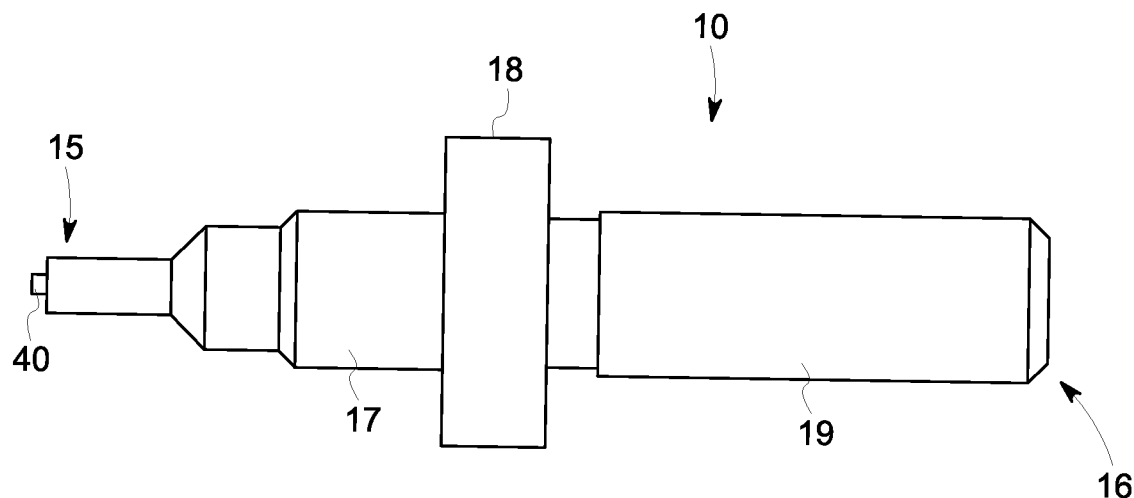

FIG. 3b shows the first light guide holder 10 in a planar view, with the output light guide 40 extending from the first end 15 and the threaded section 17 clearly shown. A flange 18 may also be provided along an outside of the first light guide holder 10, to separate the threaded section 17 from a handle 19 by which the first light guide holder 10 can be held during mounting.

Figure 4A:
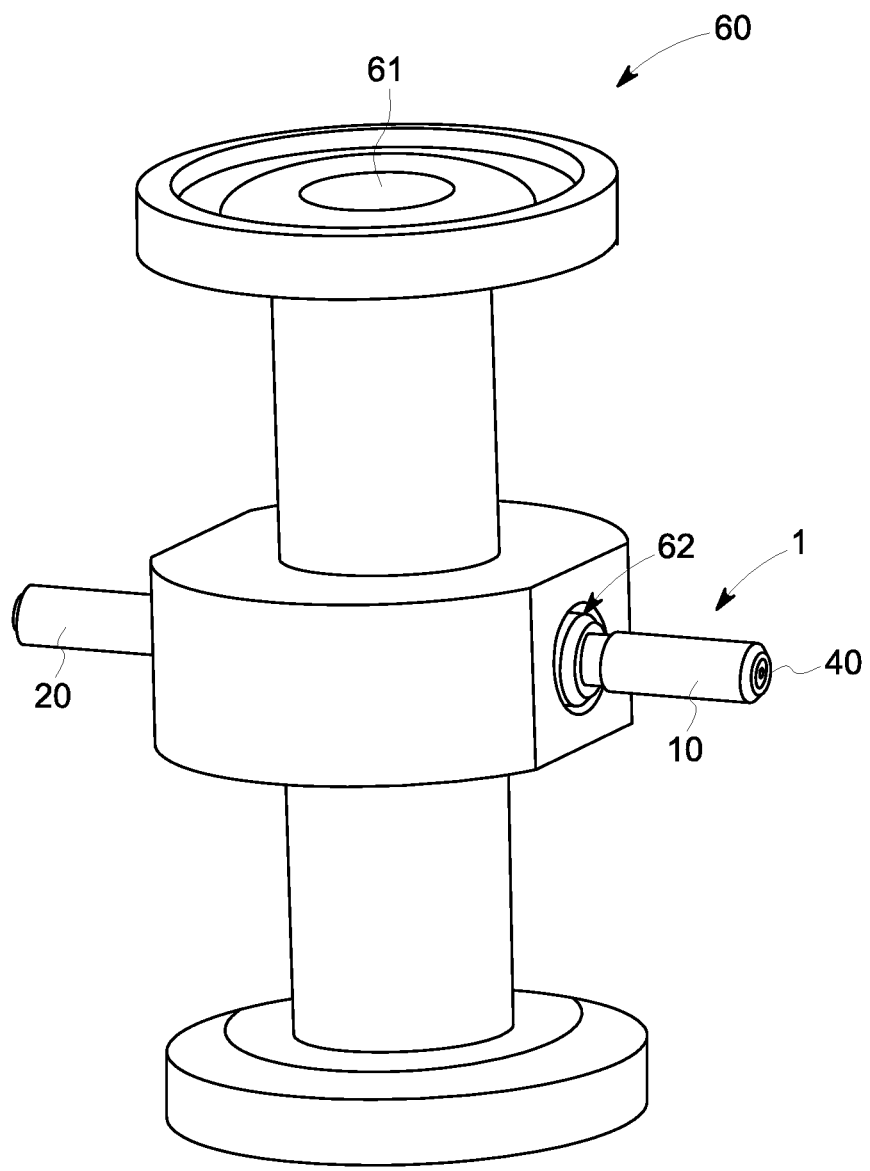
FIG. 4a shows a measuring device with the optical flow cell of FIG. 1-2.
Figure 4B:
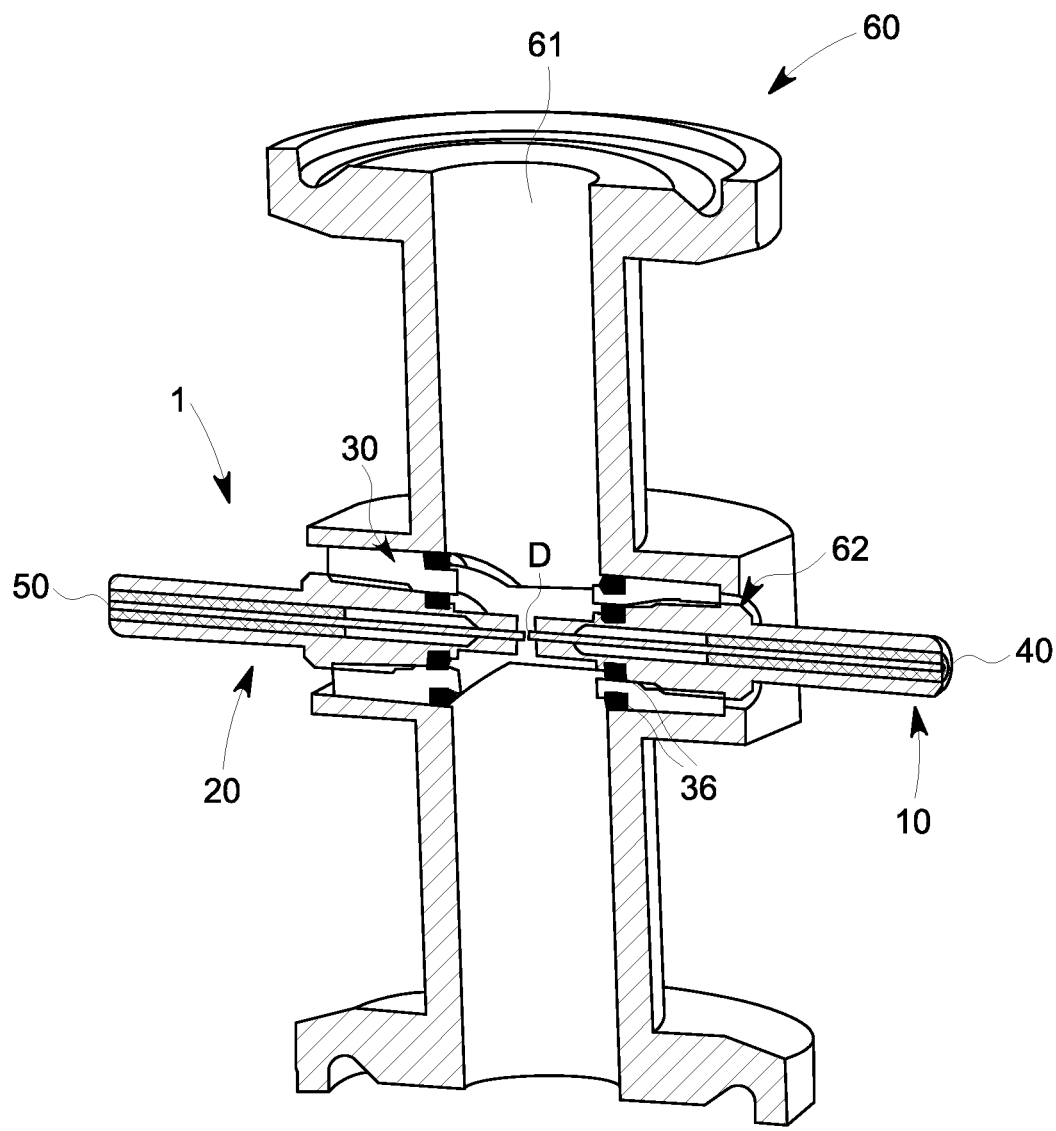
Figure 5:
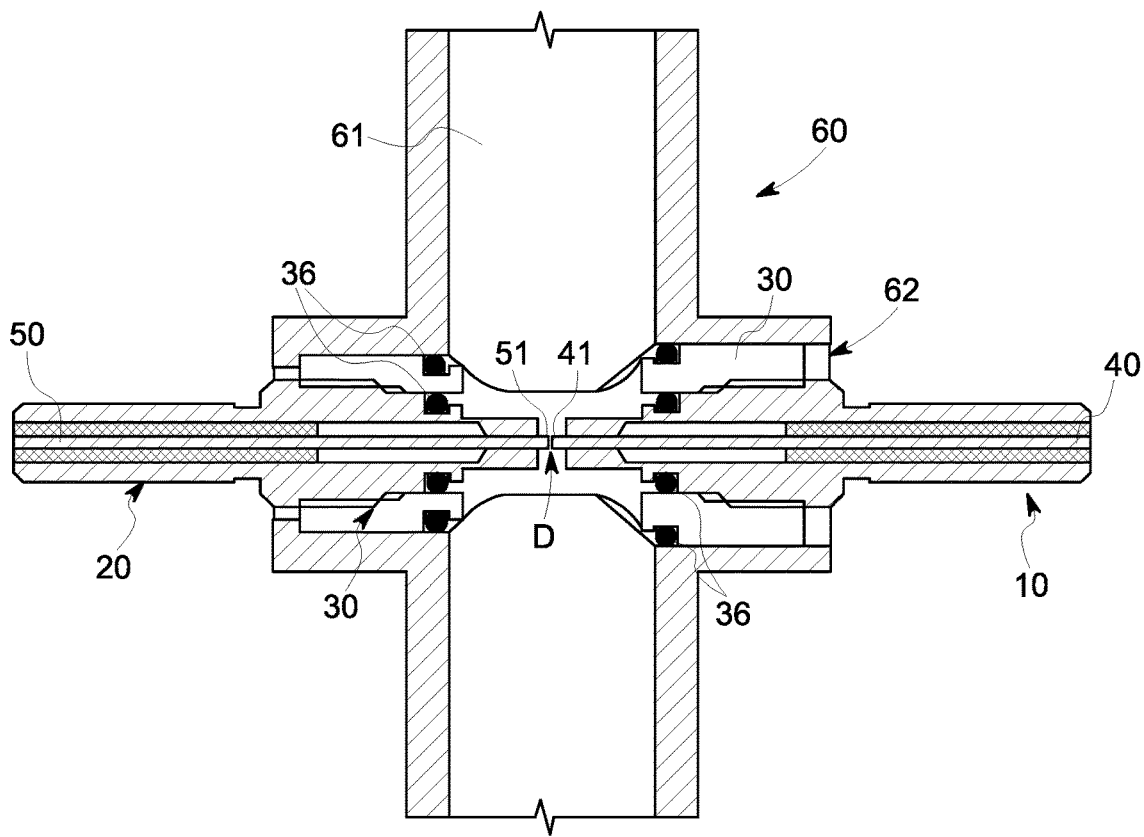
FIG. 5 shows a cross-sectional view of the measuring device of FIG. 4a-4b with the optical flow cell of FIG. 1-2.
Figure 6:
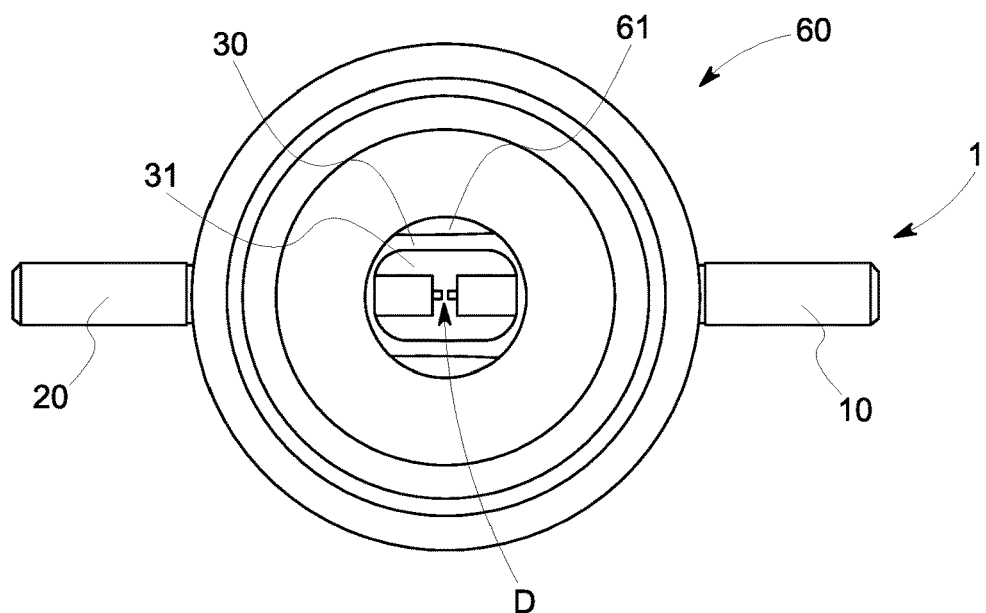

FIGS. 4a and 4b disclose a measuring device 60 in which an optical flow cell 1 is mounted for performing measurements on a substance flowing through a flow channel 61 that extends through the measuring device 60. The measuring device 60 has an optical flow cell mounting site 62 that is able to receive an optical flow cell 1 according to the invention so that the transversal through hole 31 of the holder 30 coincides with the flow channel 61 and a fluid can flow through the holder 30 and pass the output and input light guides 40, 50 to allow a detection of a substance in the fluid. In FIG. 5, the optical flow cell 1 is shown mounted in the measuring device 60, with the transversal through hole 31 aligned with the channel 61 to allow a flow through the optical flow cell 1 and thereby measurements on the portion of the flow that passes through the first distance D between the output light guide 40 and the input light guide 50. The sealing rings 36 are also shown and serve to prevent leakage along the mounting site 62 and the first and second holes 32, 33. When mounted in a measuring device 60, the optical flow cell 1 is connected to a system (not shown) with suitable equipment for transmitting light to the output light guide 40, receiving light captured by the input light guide 50, analyzing said received light and presenting and/or storing data from the optical flow cell 1 as is well known in the art. FIG. 6 shows the measuring device 60 from one end of the channel 61, showing how the optical flow cell 1 is mounted to align the through hole 31 of the holder 30 with the channel 61 itself.

Figure 7:
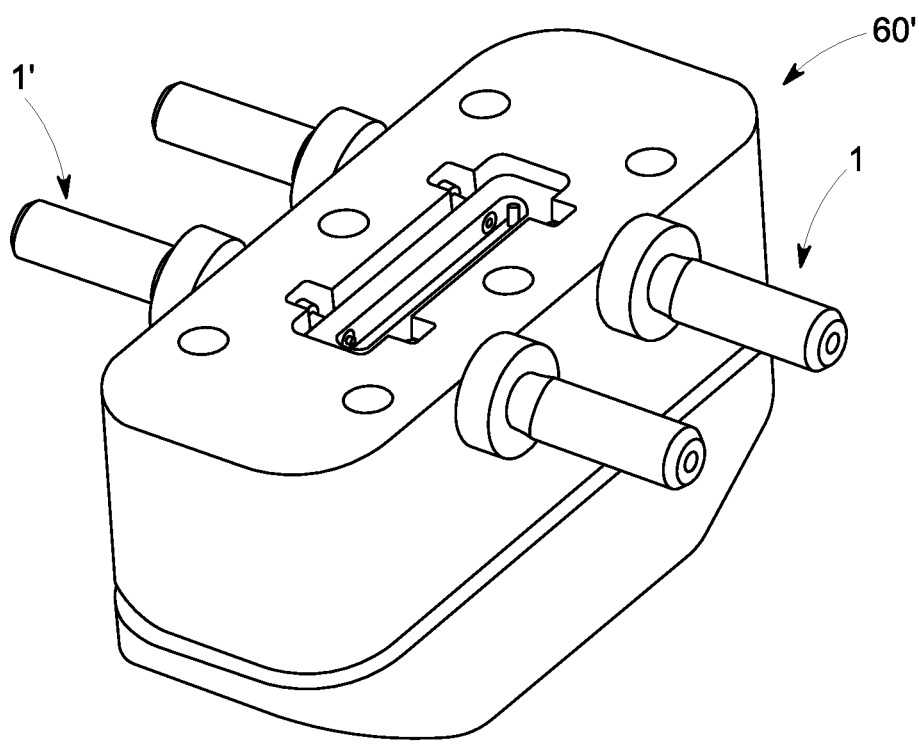
FIG. 7 shows a measuring device with two optical flow cells according to the invention.

In FIG. 7, a different measuring device 60' is shown with two optical flow cells 1, 1' according to the invention. The optical flow cells 1, 1' are similar in design and configuration, so that each component of a first optical flow cell 1 corresponds to a component of a second optical flow cell 1'. The optical flow cells 1, 1' may differ in the pathway D, however, so that a dual pathway measuring device 60' is created.

The mounting of the light guides 40, 50 in the light guide holders 10, 20 will now be described in more detail with reference to the Figures, and it is to be noted again that what is said with reference to the first light guide holder 10 and the output light guide 40 can also be applied to the second light guide holder 20 and the input light guide 50.

Thus, the output light guide 40 is provided and mounted in the first light guide holder 10 by insertion through the second end 16 and is guided into the narrow portion 12 by the tapering portion 14. The output light guide 40 is allowed to protrude from the first end 15. Then, the longitudinal through hole 11 is filled with the substance, preferably an inert adhesive as mentioned previously. After the substance has been applied, the tube 43 is mounted around the output light guide 40 from the second end 16, forcing the substance to penetrate the narrow portion 12 as well as between the output light guide 40 and the tube 43 and between the tube 43 and the first light guide holder 10. The substance is hardened and surplus substance is removed, and then the light exit surface 41 and an opposing end of the output light guide 40 at the second end 16 are polished to interfere as little as possible with the forthcoming measurements. Thanks to the inert nature of the substance, it can be present within the measuring device 60 without reacting with the flow. It is also advantageous for the substance to have a low viscosity, preferably less than 400 cPs, to allow for easy insertion of the tube 43.

The mounting of the optical flow cell 1 will now be described in more detail. After the input light guide 40 has been mounted in the first light guide holder 10 and the output light guide 50 has been mounted in the second light guide holder 20, as described above, the holder 30 is provided. The first light guide holder 10 is inserted through the first hole 32 by screwing so that the first light guide holder thread 17 interacts with the holder thread 34. Similarly, the second light guide holder 20 is inserted through the second hole 33 by screwing, wherein the second light guide holder thread 27 interacts with the holder thread 35. During the insertions, the through hole 31 of the holder is closely observed, and the screwing of each light guide holder 10, 20 is performed until the first distance D between the light exit surface 41 and the light entrance surface 51 is at a desired value, such as 0.1 mm. Thanks to the close observation, for instance through a microscope or similar equipment, the first distance D can be determined within small tolerances, and when the desired value has been achieved, the first light guide holder 10 and second light guide holder 20 are fixated in relation to the holder 30, for instance by applying an adhesive as such as an epoxy resin or a methacrylate to the threads 17, 34, 27, 35 so that further movements are prevented. The sealing rings 36 can be applied to the first and second light guide holders 10, 20 and the holder 30 before mounting. The holder 30 further has a larger external diameter where the first light guide holder 10 is held than where the second light guide holder 20 is held. This is to facilitate mounting at the optical flow cell mounting site 62.

The mounting of the optical flow cell 1 in the measuring device 60 is thus performed by inserting the optical flow cell 1 into an optical flow cell mounting site 62 when the measuring device 60 is not in use, and to adjust the optical flow cell 1 until the transversal through hole 31 is aligned with the flow channel 61 so that the pathway D of the optical flow cell 1 can be exposed to a flow of a fluid through the flow channel 61. The output light guide 40 and input light guide 50 are then connected to the system as mentioned above and as is well known in the art, and the measuring device 60 can be used as is also commonly known in the art.

When the optical flow cell 1 becomes damaged, dirty or simply clogged by the fluid in the flow channel 61, operation can be interrupted and the flow channel 61 drained, so that the optical flow cell 1 can be disconnected from the system and removed from the measuring device 60. The optical flow cell 1 can then be cleaned and reinserted. If the optical flow cell 1 has been damaged, it can alternatively be discarded and a new optical flow cell inserted in the optical flow cell mounting site 62, so that operation can be resumed with the same precision and accuracy as before damages or clogging occurred. Of course, if a different pathway D is desired, the optical flow cell 1 can simply be removed as described herein and replaced by a similar optical flow cell with a different pathway D. Thereby, measurements of substances of varying concentration in the fluid can be performed by the same measuring device 60 in an easy and convenient way and without requiring calibration. For maintenance or repair, the whole flow cell 1 can be replaced, with no need to recalibrate the device.

The invention is not to be seen as limited by the embodiments described above, but can be varied within the scope of the appended claims as is readily apparent to the person skilled in the art. For instance, the same type of holder can be used for different pathways and multiple flow cells can be inserted into the same measuring device.

What is claimed is:

1. An optical flow cell for a measuring device, the optical flow cell comprising:
    a holder configured to be removably mounted across a flow channel through a mounting site hole of the measuring device;
    an input light guide including a light exit surface; and
    an output light guide including a light entrance surface,
    said input light guide and output light guide being supported by the holder, wherein the holder extends along a first axis configured to be transverse to the flow channel and has a through hole for receiving a flow of a sample fluid, said through hole being substantially transverse to said first axis,
    wherein the input light guide and output light guide further are arranged in said holder so that the light exit surface and the light entrance surface protrude from the holder and extend into said through hole and are arranged to be in optical alignment with each other along the first axis and at a first distance from each other, and
    wherein the holder comprises a material with a thermal expansion of less than $20 \times 10^{-6}$ m/mK.

2. The optical flow cell according to claim 1, further comprising sealing rings provided to prevent leakage from the through hole.

3. The optical flow cell according to claim 1, wherein the material comprises titanium or a ceramic.

4. The optical flow cell according to claim 1, wherein the first distance is 0.2 mm or less.

5. The optical flow cell according to claim 1, wherein the input light guide is mounted in a first light guide holder and the output light guide is mounted in a second light guide holder each light guide preferably held in place in its respective holder by means of an adhesive, and wherein the first light guide holder and second light guide holder are mounted in the holder in respective first and second mounting holes.

6. The optical flow cell according to claim 5, wherein the mounting holes are threaded and the first light guide holder and second light guide holder comprise corresponding threads, whereby the distance is variable.

7. The optical flow cell according to claim 5, wherein the input light guide is arranged to protrude from the first light guide holder into the through hole, and wherein the output light guide is arranged to protrude from the second light guide holder into the through hole.

8. The optical flow cell according to claim 1, wherein the first light guide holder is elongated and has a first end and a second end, and a longitudinal through hole with a narrow portion at the first end and a wide portion at the second end, the wide portion ending in a tapering portion that is connected to the narrow portion so that a diameter of the longitudinal through hole is smoothly decreased from a second diameter at the wide portion to a first diameter at the narrow portion, the first diameter being only slightly larger than a diameter of the input light guide.

9. The optical flow cell according to claim 8, wherein the first diameter is less than 10% larger than the diameter of the input light guide.

10. The optical flow cell according to claim 1, wherein the input light guide is held by a tube, preferably a tube that surrounds the input light guide.

11. The optical flow cell according to claim 10, wherein the tube is stiff and resilient so that mounting is facilitated.

12. The optical flow cell according to claim 1, further comprising a flange provided along an outside of the first light guide holder, to separate a threaded section from a handle by which the first light guide holder can be held during mounting.

13. A measuring device for optical detection, comprising at least one optical flow cell according to claim 1.

* * * * *